(12) United States Patent
de Moraes et al.

(10) Patent No.: US 9,710,889 B2
(45) Date of Patent: Jul. 18, 2017

(54) SCREEN ORIENTATION (71) Applicant: HEWLETT-PACKARD DEVELOPMENT COMPANY, L.P., Houston, TX (US)

(72) Inventors: Juliano Godinho Varaschin de Moraes, Mountain View, CA (US); Nicholas Hallas, Palo Alto, CA (US); Carol Ozaki, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/917,805

(22) PCT Filed: Sep. 13, 2013

(86) PCT No.: PCT/US2013/059816
§ 371 (c)(1),
(2) Date: Mar. 9, 2016

(87) PCT Pub. No.: WO2015/038151
PCT Pub. Date: Mar. 19, 2015

(65) Prior Publication Data
US 2016/0239943 A1 Aug. 18, 2016

(51) Int. Cl.
*G09G 5/00* (2006.01)
*G06T 3/60* (2006.01)
(Continued)

(52) U.S. Cl.
CPC .............. *G06T 3/60* (2013.01); *G06F 1/1613* (2013.01); *G06F 1/1637* (2013.01);
(Continued)

(58) Field of Classification Search
None
See application file for complete search history.

(56) References Cited

U.S. PATENT DOCUMENTS

2010/0245391 A1 9/2010 Chen et al.
2010/0302278 A1* 12/2010 Shaffer ................ G06F 3/0481
345/659
(Continued)

FOREIGN PATENT DOCUMENTS

EP 2498165 9/2012
EP 2605611 6/2013
(Continued)

OTHER PUBLICATIONS

How to Let the Portrait App in Landscape Mode, (Web Page), Jan. 13, 2012, http://stackoverflow.com/questions/10996254/how-to-let-the-portrait-app-in-landscape-mode.

*Primary Examiner* — David H Chu
(74) *Attorney, Agent, or Firm* — HP Inc. Patent Department (57) ABSTRACT

An example method for controlling the orientation of a display screen of a computing device is provided in accordance with an aspect of the present disclosure. The method includes identifying a request for a change of an orientation of a screen in a device from a first screen orientation to a second screen orientation. The request may be sent by a mobile application. The method further includes determining whether the device has an ability to rotate the screen to the second orientation, canceling the request for change of the orientation of the screen, and adjusting the resolution of the screen to emulate rotation of the screen to the second orientation while remaining in the first orientation.

15 Claims, 6 Drawing Sheets

(51) Int. Cl.
 *G06F 1/16* (2006.01)
 *G06F 9/44* (2006.01)
 *G06T 3/40* (2006.01)

(52) U.S. Cl.
 CPC .............. *G06F 9/4443* (2013.01); *G06T 3/40*
 (2013.01); *G06F 2200/1614* (2013.01)

(56) References Cited

U.S. PATENT DOCUMENTS

2011/0310041 A1* 12/2011 Williams ............ G06F 11/3696
 345/173
2012/0040719 A1* 2/2012 Lee ........................ G06F 1/1626
 455/557
2012/0262489 A1* 10/2012 Caliendo, Jr. ............ G09G 5/36
 345/652

FOREIGN PATENT DOCUMENTS

| JP | 2003-114670 | 4/2003 |
|---|---|---|
| WO | 10-2003-0095734 | 12/2003 |
| WO | WO-2012-106651 | 8/2012 |
| WO | WO-2013086903 | 6/2013 |

\* cited by examiner

SCREEN ORIENTATION

BACKGROUND

Computing devices and related technologies have seen dramatic improvements over the past years. Increasing number of today's users have stationary computing devices and also carry mobile computing devices, where both type of devices are equipped with a diverse set of communication interfaces. Through these interfaces, the devices can establish communications with each other, reach the Internet, or access various data services through networks. Various devices such as personal computers, all in one computing devices, Internet-enabled tablets, smart phones, laptops, televisions, and gaming consoles have become essential personal accessories, connecting users to friends, work, and entertainment. Users now have more choices and expect to access programs, data, and other content on all types of devices at all times. The large number of users that utilize different type of computing devices stimulates providers to offer devices that can meet the increase in user demand, support the broad array of available services, and provide reliable communication.

DETAILED DESCRIPTION

With the recent improvements in technology, computing devices (e.g., personal computers, laptops, smartphones, tablets, etc.) continue to play an increasing role in people's life. Different users rely on different type of computing devices for many day-to-day activities and work related tasks. With the recent development and increased popularity of advanced mobile or handheld computing devices (e.g., smartphones, tablets, etc.), many applications and programs are developed specifically for these mobile devices. While a significant number of computer users are moving to handheld computing devices because of their simplicity, mobility, and usability, many other users continue to use stationary computing devices (e.g., desktops, all in one devices, etc.) that offer various advantages over mobile computing devices (e.g., larger screens, greater processing power, etc.)

Unlike stationary computing devices that have a fixed orientation of their display screens (e.g., landscape orientation, portrait orientation, etc.), applications displayed on mobile or handheld computing devices can be viewed in either landscape or portrait mode. Most mobile phones and tablets include hardware components (e.g., accelerometer, gyroscope, etc.) that recognize a request for change in orientation and adjust the screen of the mobile device accordingly. The available screen rotation on mobile devices allows users to view applications and content on these devices in different orientations and aspect ratios.

In other words, the screens of these mobile devices can rotate and adjust the orientation of the content based on the displayed content and/or the specific application running on the device. Aspect ratio is the ratio of the width of an image to the height of the image that is displayed on a screen of a device. For example, a handheld device may generally have a screen aspect ratio of 3:4 when the tablet is taller than it is wide (i.e., the tablet shows an application in a portrait orientation). When a user turns the device on its side, it can change its aspect ratio to 4:3 (i.e., the content appears wider than it is tall and the tablet shows an application in a landscape orientation). Another popular aspect ratio for handheld devices is 16:9.

Many users still prefer to operate stationary computing devices (e.g., all in one devices, desktops, etc.) or convertible computing devices. These users expect to access all programs, applications, and content generally available on their mobile devices on their stationary devices. Today, many stationary computing devices may use mobile operating systems and may run mobile applications. However, due to the fact that the display screens of the stationary computing devices are larger and they may not rotate, these devices may only support one screen orientation (e.g., landscape, portrait, etc.). For example, many of the available stationary computing devices support displayed content only in a landscape orientation.

When writing mobile applications, many developers may choose the display orientation of the application. As most smartphones have an elongated vertical display (i.e., a portrait orientation), there are many legacy mobile applications from these smartphones that are only available in a portrait orientation. Further, many mobile application stores implement a filtering mechanism based on the evaluated hardware components or features of the device that is downloading a particular mobile application. These filtering mechanisms may not allow a user to download the application to a device that does not support multiple display orientations.

Because stationary computing devices or convertible computing devices may not support multiple screen orientations, many of the users that want to use mobile applications on their modern stationary computing devices may not be able to do that. In fact, a very large number of the available mobile applications (e.g., 40%) may not be available to these stationary or convertible computing devices. This creates an issue for the manufacturers and suppliers of these computing devices because users may not be willing to purchase such devices if they cannot install and use many popular applications that are generally available on their mobile devices.

The present description is directed to systems, methods, and computer readable media for displaying content from mobile applications on stationary or convertible computing devices without rotating the screen of these devices. That way, all mobile applications can be installed and used on devices that may support only one display orientation and may not be able to physically rotate their screens. The systems, methods, and computer readable media address the above-identified issue by modifying or adjusting the resolution of the screen of these devices to emulate rotation of the screen without actually changing the present orientation. The devices display the content of the mobile applications on the screen with the new resolution.

By this novel and previously unforeseen approach, the described systems, methods, and computer readable media provide support for legacy applications that were originally developed only for handheld devices and allow these applications to run on stationary devices that support only one orientation. The present disclosure also offers cost reduction related to identification components and hardware components of the stationary and/or convertible computing devices by making the physical rotation from one orientation to another unnecessary. Thus, these stationary and/or convertible devices do not need to include accelerometers, sensors, or other hardware components to assist with the rotation of the screen.

In an example implementation a method for controlling the orientation of the display screen of a computing device is provided. The method includes identifying a request for a change of an orientation of a screen in a device from a first screen orientation to a second screen orientation. The request may be sent by a mobile application. The method further includes determining whether the device has an ability to rotate the screen to the second orientation, canceling the request for change of the orientation of the screen, and adjusting the resolution of the screen to emulate rotation of the screen to the second orientation while remaining in the first orientation.

In another example implementation, a computing device that includes a screen and a processor having a control unit is provided. The control unit is to receive, from a mobile application, a request for a change of the orientation of the screen from a first orientation to a second orientation. Further, the control unit is to determine whether the screen of the computing device is docked at a stationary position. Also, the control unit is to cancel the request for change of the orientation of the screen when at least the screen is docked, change the resolution of the screen by determining a new resolution parameter of the screen, and display the mobile application on the screen by using the new resolution parameter of the screen.

As used herein, the terms "mobile device" and "handheld device" may be used interchangeably and refer to any one of various smartphones, cellular telephones, tablets, personal data assistants (PDA's), and other similar portable electronic devices that include a display screen, a processor, and are capable of rotating their screens between at least a first orientation and a second orientation.

As used herein, the term "stationary computing device" includes various computing devices that are intended to be used when positioned on a surface (e.g., desk, table, etc.) and include a display screen that has a fixed orientation (i.e., does not rotate). Such devices include any one of personal computers (i.e., desktops), server computers, laptop computers (with permanently attached display screens), all in one devices, and other similar devices that posses comparable characteristics.

As used herein, the term "convertible computing device" includes one of various computing devices that have a keyboard/battery portion and a display screen portion. When the display screen portion of these devices is docked or attached to the keyboard/battery portion, these devices operate as a stationary computing device and their screens may not rotate. On the other hand, when the display screen portion is not docked (i.e., it is detached from the keyboard/battery portion), these devices operate as handheld devices and a user may rotate their screens between a different orientations.

As used herein, the term "mobile application" includes one of various software applications that are developed and designed to run on mobile devices, convertible, computers and other computing devices. Mobile applications frequently serve provide users with similar services to those accessed on personal computers and are usually available through application distribution platforms.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

Figure 1:
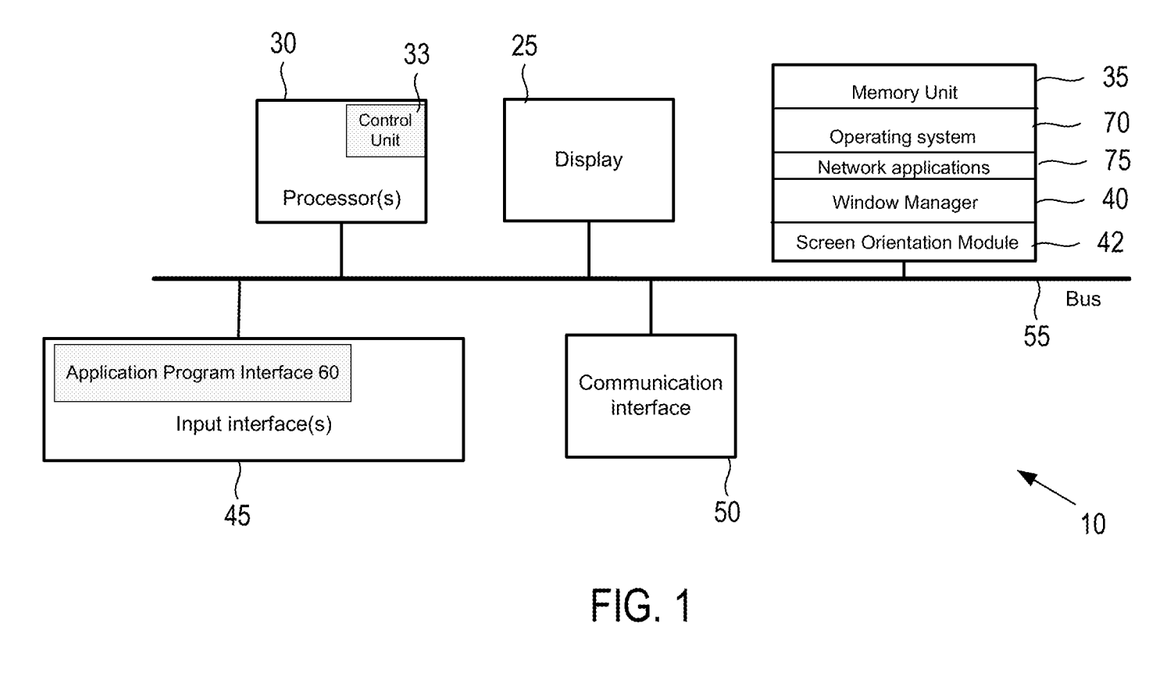
FIG. 1 is a schematic representation of an example computing device in accordance with an implementation of the present disclosure.

FIG. 1 is a schematic representation of an example computing device or system 10. The computing device 10 can be any suitable device capable of carrying out the techniques described below. In one example, the computing device 10 is a stationary computing device (e.g., all in one device, desktop, etc.) or a convertible computing device that includes a display screen that may not rotate and may only display content in one orientation (e.g., landscape or portrait). In other examples, the computing device 10 may be a mobile or handheld computing device that does not include hardware components to support screen rotation and the handheld device can only display content in one orientation. The computing device or system 10 is only one example of a suitable computing device and is not intended to suggest any limitation as to the scope of use or functionality of the device disclosed in this description.

The computing device or system 10 includes, but may not be limited to, a processor 30 (e.g., a central processing unit, a microprocessor, a microcontroller, or another suitable programmable device), a display screen 25, a memory unit 35, input interfaces 45, and a communication interface 50. Each of these components or any additional components of the computing device 10 is operatively coupled to a bus 55. The bus 55 may be any of several types of bus structures including a memory bus or memory controller, a peripheral bus, and a local bus using any of a variety of bus architectures. In other examples, the computing device 10 includes additional, fewer, or different components for carrying out similar functionality described herein.

The processor 30 includes a control unit 33 and may be implemented using any suitable type of processing system where at least one processor executes computer-readable instructions stored in the memory 35. The display screen 25 may be a transparent liquid crystal display (LCD), an organic light emitting diode (OLED) display, a plasma display, or any other suitable display.

The display screen 25 may be part of the computing device 10 (e.g., when the computing device 10 is all in one device), may be a separated component that is in electronic communication with the computing device 10 (e.g., when the computing device a desktop computer with a separate monitor), and may be a detachable component that may also be used as a handheld device (e.g., when the computing device is a convertible computing device). The display screen 25 is to display content from one or more applications running on the computing device on a window shown on the display screen.

The display screen 25 may be of different sizes and may support various types of display resolution, where display resolution is the number of distinct pixels in each dimension that can be displayed on the screen 25. For example, the display screen 25 may support display resolutions of 640× 480, 800×600, 1024×768, 1920×1080, or any other suitable display resolutions. When the display screen supports a 1920×1080 display resolution, 1920 is the total number of pixels across the height of the screen 25 and 1080 is the total number of pixels across the height of the screen 25.

The memory 35 includes any suitable type, number, and configuration of volatile or non-transitory machine-readable storage media (not shown) to store instructions and data. Examples of machine-readable storage media in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, an SD card, and other suitable magnetic, optical, physical, or electronic memory devices. The memory 35 may also be used for storing temporary variables or other intermediate information during execution of instructions to be executed by processor 30.

The memory 35 (e.g., the RAM) stores an operating system 70, such as iOS®, MS Windows®, Unix®, Linux®, and any other suitable operating system. The operating system 70 can be multi-user, multiprocessing, multitasking, multithreading, and real-time. The operating system may include various components, such as a window manager 40. In one example, the window manager 40 is a subset of the operating system that assists with the creation and management of windows displayed on the display screen 25 when a user launches a new application.

The operating system 70 can perform various tasks related to the use and the operation of the computing device 10. Such task may include installation and coordination of the various hardware components of the computer system 10; creation and management of files; operations relating to a graphical user interface in the display; recognizing input from input devices, such as a keyboard, a keypad, or a mouse; sending output to a projector and a camera; keeping track of files and directories on memory 35; controlling peripheral devices, such as printers, image capture device; and managing traffic on the bus 55.

The memory 35 further includes network applications 75 and various modules (e.g., screen orientation module 42) for controlling the operation of the screen of computing device 10. In one example, the screen orientation module 42 is included in the window manager 40. In other examples, the functions of the screen orientation module 42 may be implemented by the window manager 40. As explained in additional detail below, the screen orientation module 42 includes various computer-readable instruction components for displaying content from mobile applications in different orientations without actually rotating the screen 25 of the computing device. The network applications 75 include various components for establishing and maintaining network connections, such as computer-readable instructions for implementing communication protocols including TCP/IP, HTTP, Ethernet®, USB®, and FireWire®.

The communication interface 50 enables the computing device 10 to communicate with a plurality of networks and communication links. In some examples, the communication interface of the computing device 10 may include a Wi-Fi® interface, a Bluetooth interface, a 3G interface, a 4G interface, a near filed communication (NFC) interface, and/or any other suitable interface that allows the computing device to communicate via one or more networks. The networks may include any suitable type or configuration of network to allow the computing device 10 to communicate with any external systems or devices.

The input interfaces 45 can process information from the various external system, devices, and networks that are in communication with the computing device 10. For example, the input interfaces 45 include an application program interface 60. In other examples, the input interfaces 45 can include additional interfaces. The application program interface 60 receives content or data (e.g., video, images, data packets, graphics, etc.) associated with at least one mobile application that runs on the computing device 10.

Software stored on the machine-readable storage media and executed by the processor 30 includes, for example, firmware, applications, program data, filters, rules, program modules, and other executable instructions. The control unit 33 retrieves from the machine-readable storage media and executes, among other things, instructions related to the control processes and methods described herein.

When executed, the instructions cause the control unit 33 to intercept a request for a change of the orientation of the screen 25 from a first orientation (e.g., landscape) to a second orientation (e.g., portrait). The request may be sent by a mobile application. Further, the instructions cause the control unit 33 to determine whether the computing device 10 includes components to rotate the screen 25 to the desired orientation and to cancel the request for change of the orientation of the screen when the device 10 does not include components to rotate the screen. The instructions also cause the control unit 33 to adjust the resolution of the screen 25 and to display the mobile application on the screen 25 by using the new resolution in order to emulate rotation of the screen to the second orientation while remaining in the first orientation.

As noted earlier, applications and programs that are displayed on most mobile or handheld computing devices can be viewed in different orientations (e.g., landscape, portrait, etc.) by simply rotating the handheld device and its screen. On the other hand, stationary computing devices and docked convertible devices may not be able to rotate their screens. Many times the screens of these devices are too large, the devices/screens are placed in a permanent position, and, therefore, screen rotation is not even an option. Further, such devices may not even include the hardware components (e.g., accelerometers, sensors, etc.) to support change in the orientation of the windows displayed on their screens.

However, stationary computing devices or convertible computing devices are still preferred by many users. These users expect that these devices are able to run mobile applications and allow them to access all programs and content generally available to their mobile devices. Because many stationary computing devices and convertible devices (i.e., when docked) may only support one screen orientation (e.g., landscape, portrait, etc.), these devices cannot support mobile application that require change or rotation of the screen orientation.

Further, many existing mobile applications may only support one display orientation. In most situations, these mobile applications are only available in a portrait orientation because they were developed for handheld devices with elongated vertical displays. For example, many mobile applications may be developed to require the content or image associated with the application to be displayed at a specific aspect ratio—4:3 (1.33:1) aspect ratio, 16:9 (1.77:1) aspect ratio, or other popular aspect ratio. In addition, filtering mechanisms in different mobile application stores may not allow users to download mobile applications to stationary computing devices that do not support multiple display orientations. Therefore, a large number of existing mobile applications may not be available to stationary or convertible computing devices.

With continued reference to the computing device or system 10 shown in FIG. 1, the display screen 25 of the device 10 may support various display resolutions and may only support one screen orientation (e.g., landscape). Thus, a user of the computing device 10 may not be able to download or use some existing mobile applications that require switching the display screen to a different orientation (e.g., portrait). The methods described below propose displaying content from mobile applications on the screen 25 of the computing device 10 without rotating the screen 25. Specifically, the methods propose using the screen orientation module of the 42 of the window manager 40 to adjust the resolution of the screen 25 to emulate rotation of the screen to the desired new orientation while the screen 25 remains in its original orientation. That way, existing legacy applications that were originally developed only for handheld devices may run on stationary and convertible computing devices.

Figure 2:
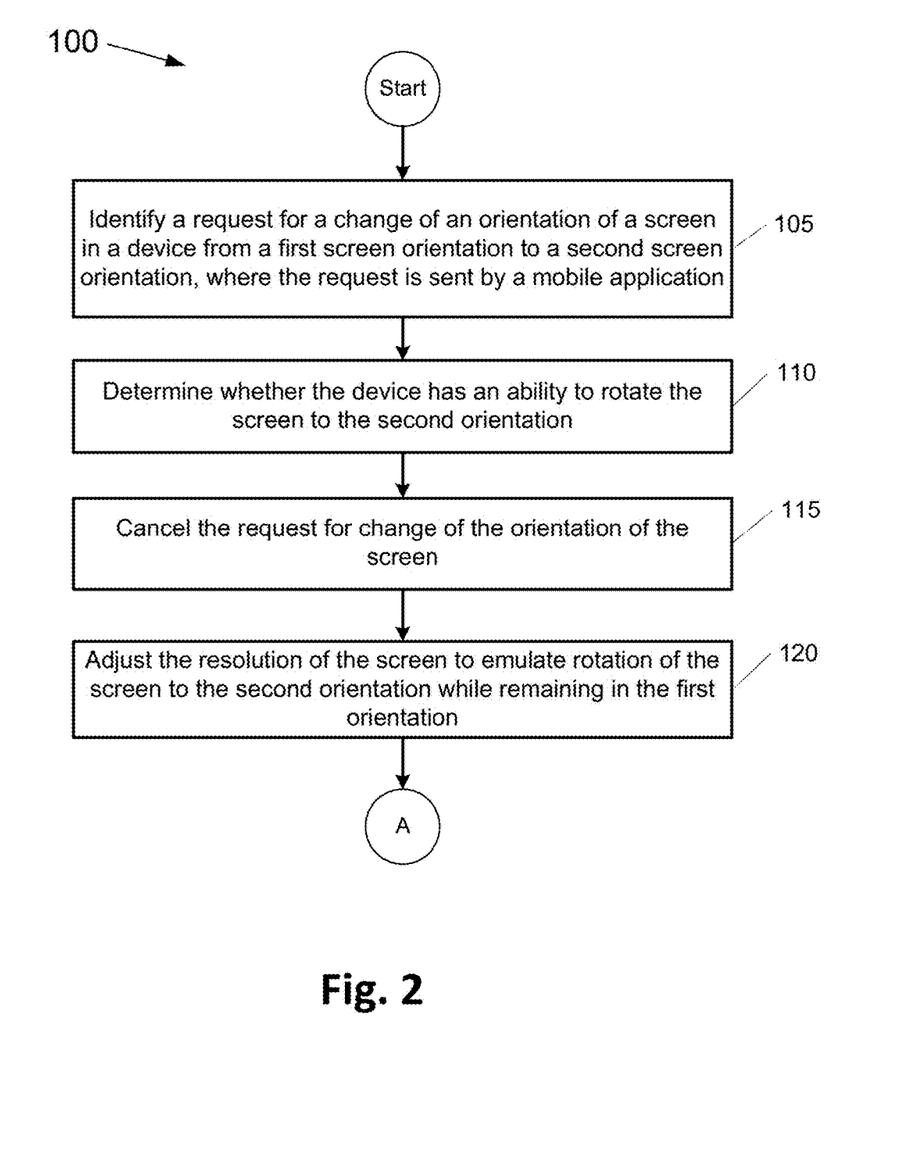
FIG. 2 illustrates a flow chart showing an example of a method for controlling the orientation of the display screen of the computing device shown in FIG. 1 in accordance with an implementation of the present disclosure.

FIG. 2 illustrates a flow chart showing an example of a method 100 for controlling the orientation of the display screen 25 of the computing device 10. In one example, the method 100 can be executed by the control unit 33 of the processor of the computing device 10. Various steps described herein with respect to the method 100 are capable of being executed simultaneously, in parallel, or in an order that differs from the illustrated serial manner of execution. The method 100 is also capable of being executed using additional or fewer steps than are shown in the illustrated examples.

The method 100 may be executed in the form of instructions encoded on a non-transitory machine-readable storage medium executable by a processor 30 of the computing device 10. In one example, the instructions for the method 100 are stored in the screen orientation module of the 42 of the window manager 40.

The method 100 begins at step 105, where the control unit 33 identifies or intercepts a request for a change of the orientation of the screen 25 in the device 10 from a first screen orientation to a second screen orientation. In the implementation described in relation to FIG. 2, the computing device 10 is a stationary computing device or system and the request is sent by a mobile application (not shown). The mobile application may be previously installed on the device 10 and is currently being opened by the user. Alternatively, the mobile application may be currently downloaded by the user. In any event, the mobile application may require that the display screen 25 displays a window in a specific orientation that is different from the current orientation of the screen. The computing device 10 may run at least one application or multiple applications simultaneously.

In the described implementation, the first screen orientation may be a landscape orientation and the second screen orientation may be a portrait orientation. In other words, the screen 25 of the computing device 10 may generally display windows in a landscape orientation and the mobile application may request a change to a portrait orientation. However, it is to be understood that the first orientation (i.e., the orientation generally displayed by the computing device 10) can be a portrait orientation (or any other applicable orientation) and the second orientation (i.e., the orientation requested by the mobile application) can be a landscape orientation (or any other applicable orientation).

Next, at step 110, the control unit 33 determines whether the computing device 10 has an ability to rotate the screen 25 to the second orientation. For example, the control unit 33 determines whether the computing device 10 includes components (e.g., accelerometer, sensors, etc.) to rotate the screen to the second orientation. As noted above, in many situations, the computing device 10 may only display content in one orientation (e.g., landscape). When the control unit 33 determines that the computing device 25 is not able to rotate the screen 25 between the first orientation and the second orientation (e.g., when the computing device 10 does not include components to rotate the screen 25), the control unit 33 cancels the request for change of the orientation of the screen (at step 115). In other implementations, the control unit 33 may ignore the request for change of the screen orientation by the mobile application instead of canceling the request.

At step 120, the control unit 33 adjusts the resolution of the screen 25 to emulate rotation of the screen 25 to the second orientation while remaining in the first orientation. In other words, the control unit 33 does not actually rotate the screen 25 or the window displayed on the screen 25 to switch between a landscape orientation and a portrait orientation. Depending on the current orientation of the screen and the orientation requested by the mobile application, the control unit 33 uses a calculation process to determine a new resolution parameter (e.g., resolution width or resolution height) of the display screen 25. For the computing device 10, which has a default landscape orientation, the calculated resolution parameter is a new resolution width. The control unit 33 then adjusts the resolution of the screen 25 by using the new resolution width and displays the mobile application on the screen by using the new resolution of the screen. The method of adjusting the resolution of the screen, including calculating the new resolution parameter of the screen 25, is described in more detail in FIG. 4.

Figure 3:
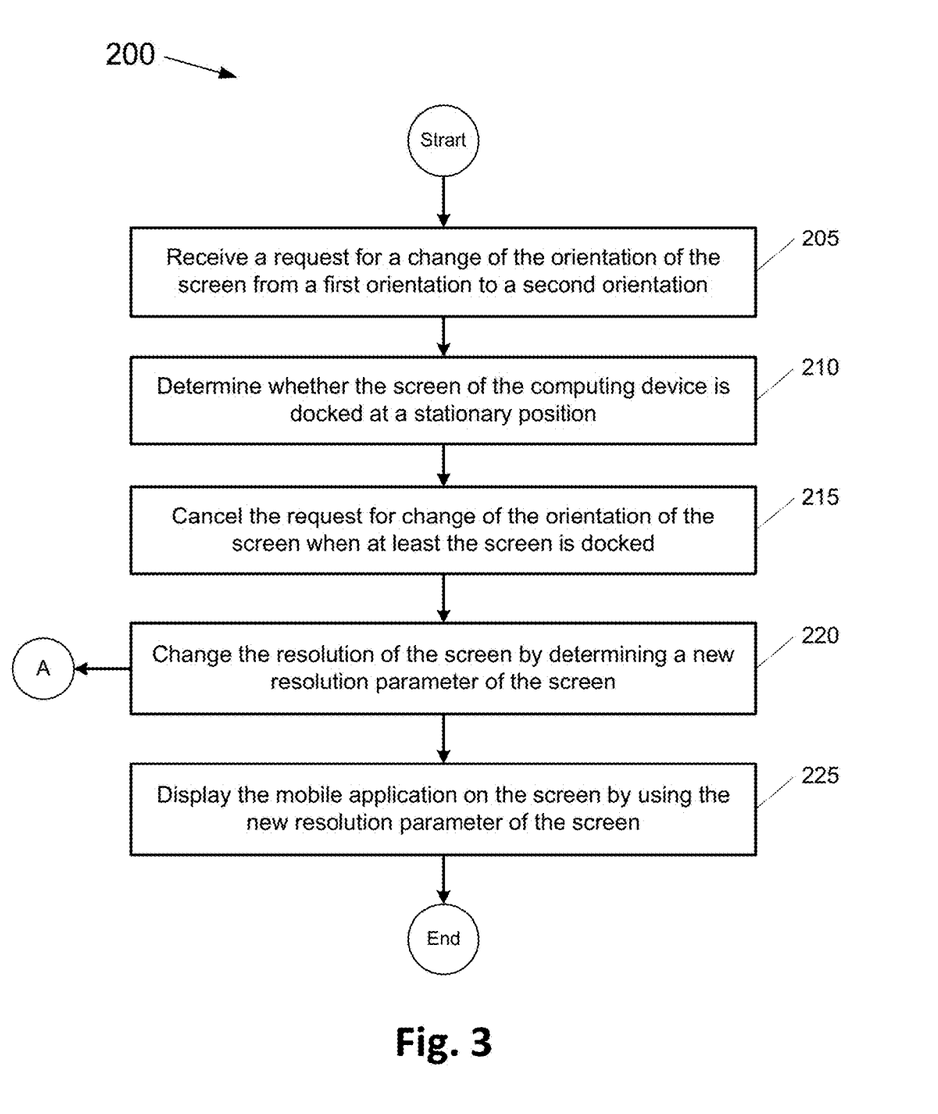
FIG. 3 shows a flow chart showing an example of an alternative method for controlling the orientation of the display screen of the computing device shown in FIG. 1 in accordance with an implementation of the present disclosure.

FIG. 3 illustrates a flow chart showing an example of an alternative method 200 for controlling the orientation of the display screen 25 of the computing device 10. The device or system 10 described in the method 200 is a convertible computing device. As noted above, the convertible computing device 10 includes at least a keyboard/battery portion and a display screen portion. When the display screen portion of convertible device 10 is docked or attached to the keyboard/battery portion, the device operates as a stationary computing device and its screen may not rotate. On the other hand, when the display screen portion is detached from the keyboard/battery portion (i.e., is not docked), the convertible device 10 operates as handheld devices and a user may rotate the screen to switch between orientations.

In one example, the method 200 can be executed by the control unit 33 of the processor of the computing device 10. Some of the steps of the method 200 may be similar to the steps of the method 100. The method 200 may be executed in the form of instructions encoded on a non-transitory machine-readable storage medium executable by a processor 30 of the computing device 10. In one example, the instructions for the method 100 are stored in the screen orientation module of the 42 of the window manager 40.

The method 200 begins at step 205, where the control unit 33 receives or identifies a request for a change of the orientation of the screen 25 in the device 10 from a first screen orientation to a second screen orientation. Depending on the specifications of the computing device, 10 the first and the second orientations can be one of landscape, portrait, or any other orientation. The request for changing the orientation is sent by a mobile application (not shown).

Next, at step 210, the control unit 33 determines whether the screen 25 of the computing device 10 is docked at a stationary position. Because the device 10 is a convertible computing device, when the screen 25 of the device 10 is docket (i.e., attached to the keyboard portion of the device 10), the device 10 operates as a stationary computing device and the screen 25 may not rotate or switch between orientations. If the control unit 33 determines that screen 25 is docket, the control unit 33 cancels the request to change the orientation of the screen (at step 215). Next, the control unit 33 changes the resolution of the screen 25 by determining a new resolution parameter of the screen 25 (at step 220).

When the original orientation of the screen is landscape and the request is to change to a portrait orientation, the new resolution parameter is a resolution width. Alternatively, when the original orientation of the screen is portrait and the request is to change to a landscape orientation, the new resolution parameter is a resolution height. As noted above, changing or adjusting the resolution of the screen by determining the new resolution parameter is described in more detail in FIG. 4. At step 225, the control unit 33 displays the mobile application on the screen 25 by using the new resolution parameter of the screen. That way, the screen appears to change orientation when, in fact, the original orientation of the screen remains the same and only the resolution of the screen changes.

Figure 4:
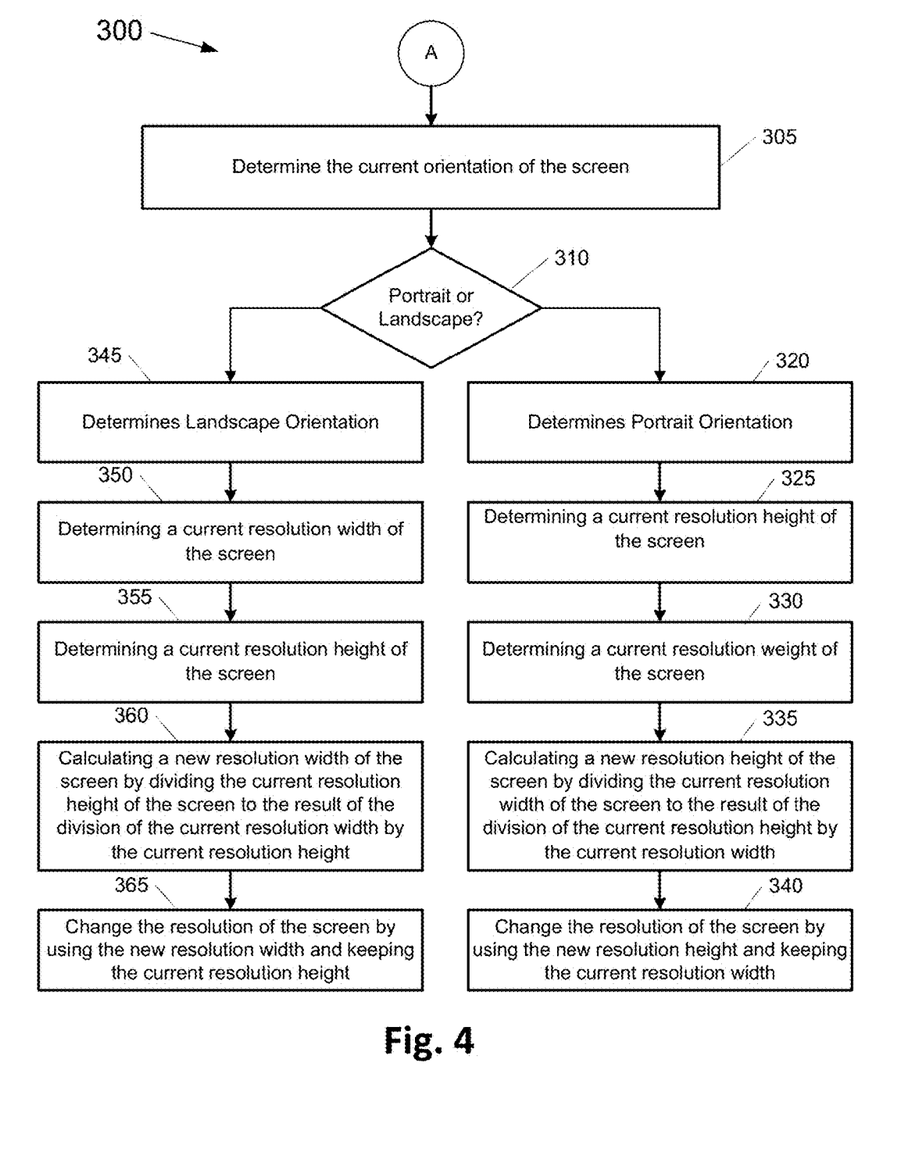
FIG. 4 illustrates a flow chart showing an example of a method for adjusting the resolution of a display screen of a computing device to emulate rotation of the screen to a different orientation in accordance with an implementation of the present disclosure.

An example implementation of the method 300 shown in FIG. 4 is described below. In one example situation, the convertible computing device 10 is docked and the screen 25 is in a landscape orientation. Then, a user launches an application that requires a change to a portrait orientation (step 205). The control unit 33 determines that that device 10 is docked (step 210) and cancels the request for change of the orientation (i.e., rotation) of the screen (step 215). The control unit then changes the resolution of the screen by determining a new resolution parameter (step 220) and displays the mobile application on the screen 25 by using the new resolution parameter (step 230). The user may decide to unlock the device 10 and use it as a handheld device while the application is still running and the screen 25 is displaying the application in the adjusted resolution. When the user undocks the device (i.e., removes the display screen portion from the keyboard/battery portion), the control unit 33 detects the running application and forces a rotation of the screen (e.g., by using hardware components in the device 10) to adjust the application in portrait orientation.

FIG. 4 illustrates a flow chart showing an example of a method 300 for adjusting the resolution of the display screen 25 of the computing device 10 to emulate rotation of the screen to a different orientation. In one example, the method 300 can be executed by the control unit 33 of the processor of the computing device 10. Various steps described herein with respect to the method 300 are capable of being executed simultaneously, in parallel, or in an order that differs from the illustrated serial manner of execution. The method 300 may be executed in the form of instructions encoded on a non-transitory machine-readable storage medium executable by a processor 30 of the computing device 10. In one example, the instructions for the method 300 are stored in the screen orientation module of the 42 of the window manager 40.

The method 300 begins at step 305, where the control unit 33 determines the current orientation of the screen 25. As noted earlier, the screen 25 may currently display application content at landscape, portrait, or any other suitable orientation. When the control unit 33 determines that the screen 25 is at landscape orientation (at step 345), the control unit 33 proceeds with calculating the new resolution parameter of the screen 25 and adjusting the resolution of the screen according to the new resolution parameter. In one example, when the screen 25 is at landscape orientation, the request from the mobile application is to change the orientation of the screen 25 to a portrait orientation. However, the screen 25 may only support landscape orientation. In that situation, the new resolution parameter required to adjust the resolution of the screen 25 is the resolution width.

At step 350, the control unit 33 determines the current resolution width of the screen 25. If the screen is at a landscape orientation and has a 1920×1080 resolution, the current resolution width is 1920 pixels. Next, at step 355, the control unit 33 determines the current resolution height of the screen 25. In the described example, the current resolution height is 1080 pixels. At step 360, the control unit 33 calculates the new resolution parameter (i.e., the new resolution width) by using the following formula:

$$\text{newWidth} = \text{currentHeight}/(\text{currrentWidth}/\text{currentHeight}) \qquad (1)$$

In that example, the control unit 33 dynamically calculates a new resolution width of the screen 25 by dividing the current resolution height of the screen by the result of the division of the current resolution width by the current resolution height. Thus, when the screen is at a 1920×1080 resolution, the new resolution width of the screen is approximately 607 pixels. The resolution height of the screen 25 remains the same. Then, the control unit 33 changes the resolution of the screen 25 by using the new resolution width and keeping the current resolution height (at step 365). The control unit 33 displays the mobile application on the screen 25 by using the adjusted resolution of the screen.

Figure 5:
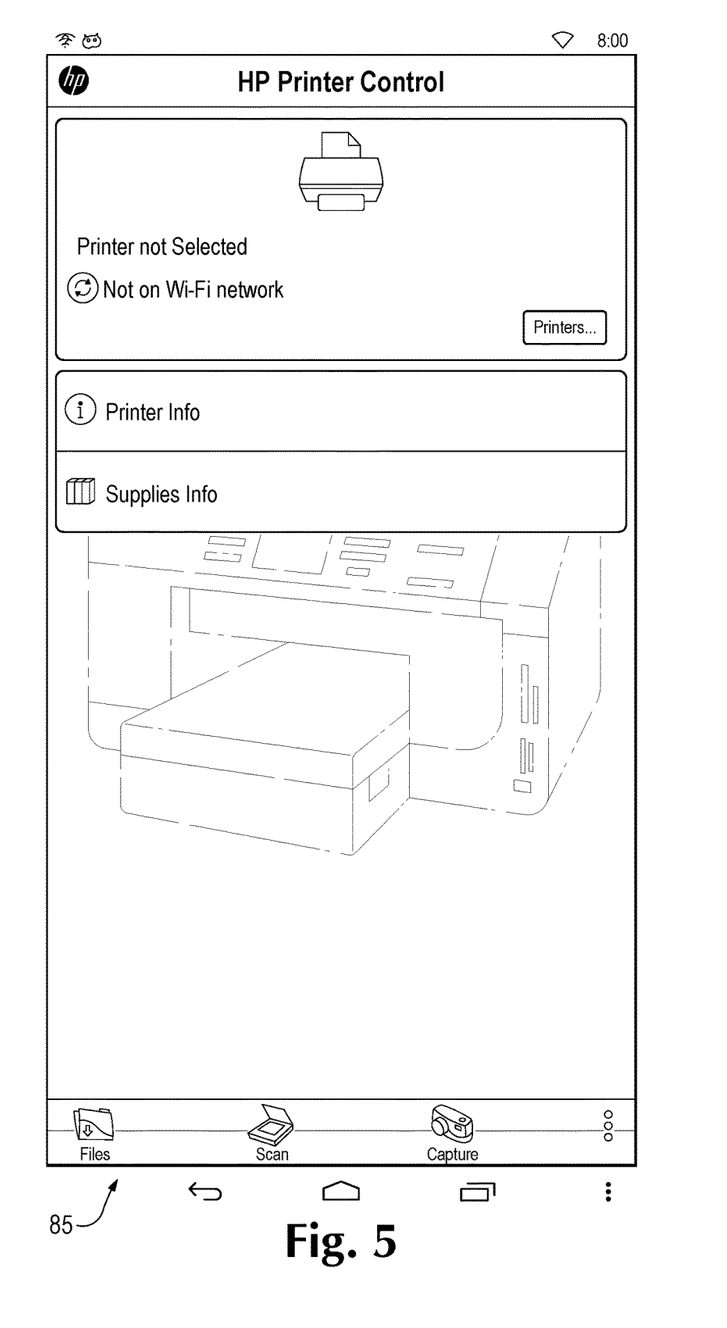
FIG. 5 illustrates an example of a display screen of a computing device with an adjusted resolution showing a content of a mobile application in accordance with an implementation of the present disclosure.

Thus, in the described example, the new resolution is 607×1080 pixels. FIG. 5 illustrates an example of the display screen 25 with an adjusted resolution showing the content 85 of a mobile application (e.g., HP® Printer Control). As illustrated in FIG. 5, the resolution width of the screen 25 is adjusted to 607 pixels while the resolution height of the screen remains the same (i.e., 1080 pixels). In one example, the computing device 10 uses a letterboxing approach to display the content on the screen by applying black vertical bars 90 on both sides of the content 85 of the mobile application. By adjusting the resolution of the screen 25, the control unit 33 emulates rotation of the screen 25 to portrait orientation while the screen remains in the landscape orientation. That way, the computing device can display mobile applications that require screen rotation and keep the original aspect ratio required by the application (e.g., 16:9 aspect ratio shown in FIG. 5 when the original resolution is 1920×1080). In other words, the display device 10 preserves the aspect ratio of the displayed mobile application as if the screen 25 actually rotated to a new orientation.

Alternatively, the control unit 33 may adjust the resolution of the screen 25 to correspond to a different aspect ratio (e.g., 4:3) by using the following formula:

$$\text{newWidth} = \text{currentHeight}/1.3 \qquad (2)$$

Figure 6:
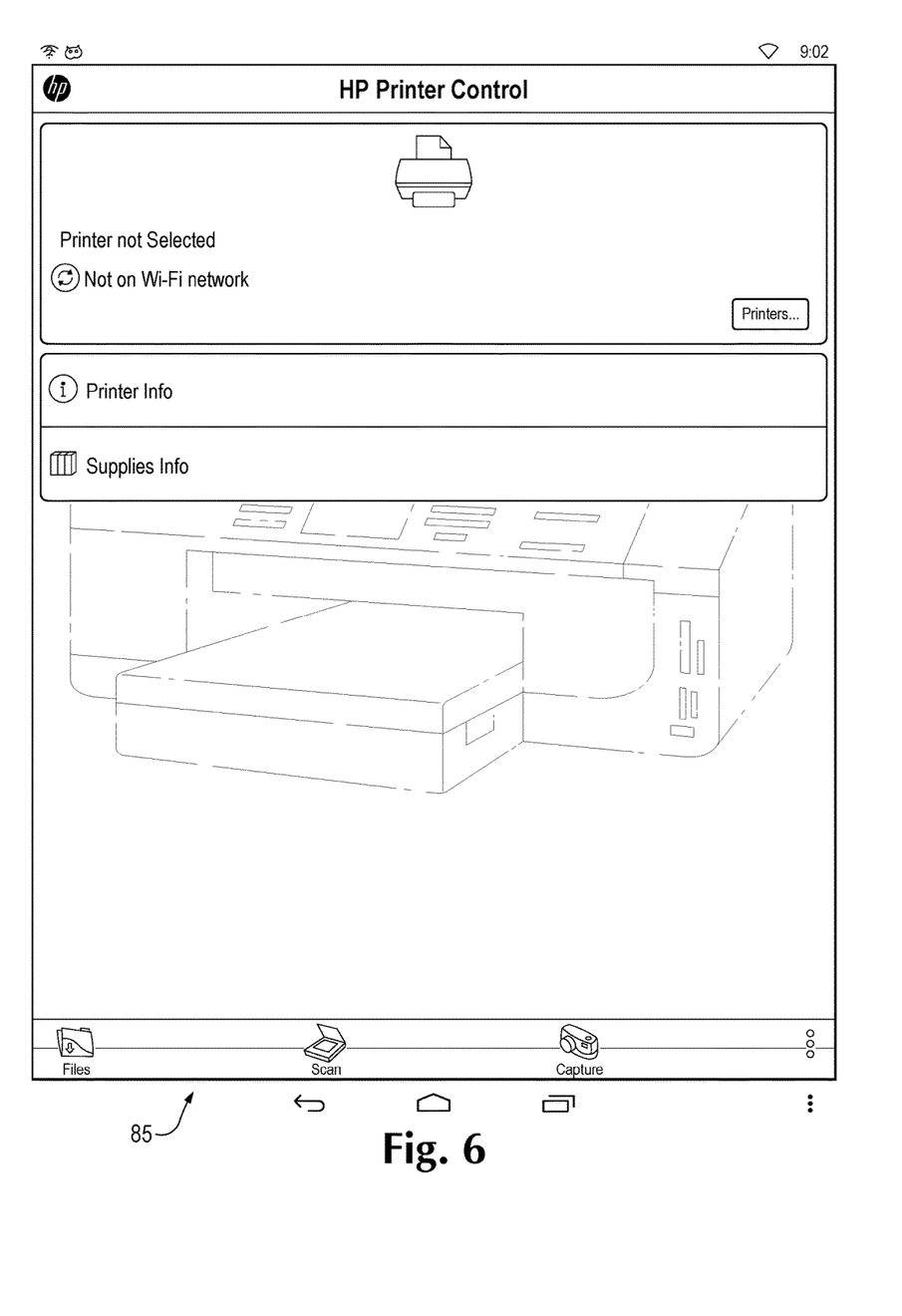
FIG. 6 illustrates an example of a display screen of a computing device with an alternative adjusted resolution showing a content of a mobile application in accordance with an implementation of the present disclosure.

In that example, the control unit 33 calculates a new resolution width of the screen 25 by dividing the current resolution height of the screen to a constant value of 1.3. Thus, when the screen is at a 1920×1080 resolution, the new resolution width of the screen is approximately 830 pixels. The resolution height of the screen 25 remains the same. Then, the control unit 33 displays the mobile application on the screen 25 by using the new resolution width of the screen. One advantage of a screen displaying content in a portrait orientation at 4:3 aspect ratio is that the content uses a larger area of the screen and reduces the black bars on the side of the content. FIG. 6 illustrates an example of the display screen 25 of the computing device 10 showing a content 85 of a mobile application with an adjusted resolution of 830×1080 and aspect ratio of 4:3.

With continued reference to FIG. 4, when the control unit 33 determines that the screen 25 is at portrait orientation (at step 320), the control unit 33 proceeds with calculating the new resolution parameter of the screen 25 and adjusting the resolution of the screen according to the new resolution parameter. In one example, when the screen 25 is at portrait orientation, the request from the mobile application is to change the orientation of the screen to a landscape orientation. However, the screen 25 may only support portrait orientation. In that situation, the new resolution parameter required to adjust the resolution of the screen is the resolution height.

At step 325, the control unit 33 determines the current resolution height of the screen 25. In the described example (i.e., when the screen is at a portrait orientation) the resolution of the screen 25 is 1920×1080 and, therefore, the current resolution height is 1920 pixels. Next, at step 330, the control unit 33 determines the current resolution width of the screen. In the described example, the current resolution width is 1080 pixels. At step 335, the control unit 33 calculates the new resolution parameter (i.e., resolution height) by using the following formula:

$$\text{newHeight} = \text{currentWidth}/(\text{currrentHeight}/\text{currentWidth}) \qquad (3)$$

In that example, the control unit 33 dynamically calculates a new resolution height of the screen 25 by dividing the current resolution width of the screen 25 by the result of the division of the current resolution height by the current resolution width. Thus, when the screen switches from a portrait to a landscape orientation, the new resolution height of the screen is approximately 607 pixels. The resolution width of the screen 25 remains the same. Then, the control unit 33 changes the resolution of the screen 25 by using the new resolution height and keeping the current resolution width (at step 340). The control unit 33 displays the mobile application on the screen 25 by using the new resolution height of the screen. Thus, in the described example, the new resolution is 607×1080 pixels.

Alternatively, the control unit 33 may adjust the resolution of the screen 25 to correspond to a different aspect ratio by using the following formula:

$$\text{newHeight} = \text{currentWidth}/1.3 \qquad (4)$$

In that example, the control unit 33 calculates a new resolution width of the screen 25 by dividing the current resolution height of the screen 25 to a constant value of 1.3. Thus, when the screen switches from a portrait to a landscape orientation, the new resolution height of the screen is approximately 830 pixels. The resolution width of the screen 25 remains the same. Then, the control unit 33 displays the mobile application on the screen 25 by using the new resolution width of the screen.

What is claimed is:

1. A method, comprising:
    identifying, with a controller, a request for a change of an orientation of a screen in a device from a first screen orientation to a second screen orientation, where the request is sent by a mobile application;
    determining, with the controller, whether the device has an ability to rotate the screen to the second orientation;
    canceling, with the controller, the request for change of the orientation of the screen; and
    adjusting, with the controller, the resolution of the screen to emulate rotation of the screen to the second orientation while remaining in the first orientation.

2. The method of claim 1, wherein adjusting the resolution of the screen further comprises determining a new resolution width of the screen and displaying the mobile application on the screen by using the new resolution width.

3. The method of claim 2, wherein determining the new resolution width of the screen further comprises:
    determining a current resolution width of the screen,
    determining a current resolution height of the screen, and
    calculating the new resolution width of the screen by dividing the current resolution height of the screen by the result of the division of the current resolution width by the current resolution height.

4. The method of claim 2, wherein determining the new resolution width of the screen further comprises:
    determining a current resolution width of the screen,
    determining a current resolution height of the screen, and
    calculating the new resolution width of the screen by dividing the current resolution
    height of the screen by a constant value of 1.3.

5. The method of claim 1, wherein the first screen orientation is a landscape orientation and the second screen orientation is a portrait orientation.

6. The method of claim 1, wherein canceling the request for change of the orientation of the screen is performed when the device does not have the ability to rotate the screen to the second orientation.

7. The method of claim 1, wherein the device is a stationary computing device that is not able to rotate the screen between the first orientation and the second orientation.

8. A computing system, comprising:
    a screen; and
    a processor having a control unit to:
        receive, from a mobile application, a request for a change of the orientation of the screen from a first orientation to a second orientation,
        determine whether the screen of the computing device is docked at a stationary position,
        cancel the request for change of the orientation of the screen when the screen is docked.
        change the resolution of the screen by determining a new resolution parameter of the screen, and
        display the mobile application on the screen by using the new resolution parameter of the screen.

9. The computing system of claim 8, wherein the new resolution parameter is a new resolution width and the control unit is to determine a current resolution width of the screen, determine a current resolution height of the screen, and calculate the new resolution width of the screen by dividing the current resolution height of the screen by the result of the division of the current resolution width by the current resolution height.

10. The computing system of claim 9, wherein the first screen orientation is a landscape orientation and the second screen orientation is a portrait orientation.

11. The computing system of claim 8, wherein the first screen orientation is a portrait orientation, the second screen orientation is a landscape orientation, and the new resolution parameter is a new resolution height, wherein the control unit is to determine a current resolution width of the screen, determine a current resolution height of the screen, and calculate the new resolution height of the screen by dividing the current resolution width of the screen by the result of the division of the current resolution height by the current resolution width.

12. A non-transitory machine-readable storage medium encoded with instructions executable by a processor of a computing device having a screen, the machine-readable storage medium comprising instructions to:

intercept a request for a change of an orientation of a screen from a landscape orientation to a portrait orientation, where the request is sent by a mobile application;

determine whether the computing device includes components to rotate the screen to the portrait orientation;

cancel the request for change of the orientation of the screen when the computing device does not include components to rotate the screen;

adjust the resolution of the screen; and display the mobile application on the screen by using the new resolution.

13. The non-transitory machine-readable storage medium of claim 12, wherein the instructions to adjust the resolution of the screen further comprise instructions to determine the new resolution width of the screen.

14. The non-transitory machine-readable storage medium of claim 13, wherein the instructions to determine a new resolution width of the screen further comprise instructions to:

determine a current resolution width of the screen, determine a current resolution height of the screen, and calculate the new resolution width of the screen by dividing the current resolution height of the screen by the result of the division of the current resolution width by the current resolution height.

15. The non-transitory machine-readable storage medium of claim 13, wherein the instructions to determine the new resolution width of the screen further comprise instructions to:

determine a current resolution width of the screen, determine a current resolution height of the screen, and calculate the new resolution width of the screen by dividing the current resolution height of the screen by a constant value of 1.3.

* * * * *

UNITED STATES PATENT AND TRADEMARK OFFICE
CERTIFICATE OF CORRECTION

PATENT NO. : 9,710,889 B2
APPLICATION NO. : 14/917805
DATED : July 18, 2017
INVENTOR(S) : Juliano Godinho Varaschin de Moraes et al.

It is certified that error appears in the above-identified patent and that said Letters Patent is hereby corrected as shown below:

In Column 12, Line 59, in Claim 8, delete "docked." and insert -- docked, --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*